Patented Apr. 29, 1952 2,595,200

UNITED STATES PATENT OFFICE 2,595,200

β-NAPHTHYL-(2)-β-ALKYL-α,α-DIALKYL-PROPIONIC ACIDS AND ESTERS THEREOF

Karl Miescher, Riehen, and Peter Wieland, Basel, Switzerland, assignors to Ciba Pharmaceutical Products, Inc., Summit, N. J.

No Drawing. Application July 6, 1949, Serial No. 103,326. In Switzerland July 30, 1948

3 Claims. (Cl. 260—469)

The present invention relates to β-naphthyl-(2)-propionic acids which correspond to the formula

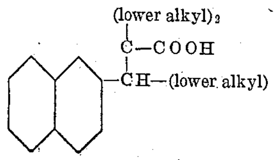

and to the preparation thereof. Characteristic of these compounds are the presence of two lower alkyl groups in the α-position of the propionic acid residue and one lower alkyl group in the β-position. Compounds of this type which are substituted by an OH group in the 6-position of the naphthalene nucleus being known, it is noteworthy that a further characteristic of the compounds of the invention is the absence of a substituent, hydroxyl or other, in the said 6-position. The present invention relates also to esters of the said β-naphthyl-(2)-propionic acids.

It is known that, in the doisynolic acid series, the estrogenic action is considerably reduced by the elimination of the phenolic hydroxyl groups and that this applies more especially in the case of the equilenins. Thus, it has been found, for example, that in the case of castrated female rats after the subcutaneous application of 1 milligram of desoxy-bisdehydrodoisynolic acid full estrus persists for only 13 to 15 days whereas it persists for 20 to 21 days when the same quantity of the 7-methyl ether of bisdehydrodoisynolic acid is administered. It has surprisingly been found that, in the β-naphthyl-propionic acid series, on the other hand, the desoxy-compounds possess a high estrogenic action. Thus, in the estrus period test it has been found that β-naphthyl-β-ethyl-α,α-dimethyl-propionic acid, in particular, is at least as active as the known estrogens.

The new naphthyl-propionic acids and their esters can be prepared according to various processes. One particular process consists in converting a naphthyl-(2)-alkyl-ketone which is unsubstituted in the 6-position of the naphthalene ring into a β-naphthyl-(2)-β-alkyl-α,α-dialkyl-propionic acid which is unsubstituted in the 6-position or into an ester thereof.

To this end, the naphthyl-(2)-alkyl-ketone which corresponds to the formula

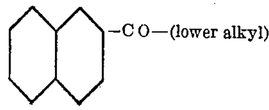

is reacted with a halogen acetic-acid ester of the formula

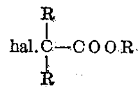

wherein R stands for lower alkyl. In the presence of a metal condensing agent, the hydroxyl group in the tertiary carbinol so obtained is split off and the so formed double bond hydrogenated and, when necessary, the esterified carboxyl group hydrolyzed.

Preferred starting materials which can be used according to the present invention are, more especially, naphthyl-(2)-ethyl ketone, naphthyl-(2)-methyl ketone and naphthyl-(2)-propyl ketone and dialkylated halogen-acetic acid esters, such as the chloracetic, bromacetic and iodoacetic acid esters. In these dialkylated acetic acid esters, the alkyl radicals may advantageously be methyl, ethyl or propyl groups. Among the dialkylated halogen-acetic acid esters, such as the methyl, ethyl or propyl esters, use may especially advantageously be made of the α-bromisobutyric acid methyl or ethyl ester. The metal condensing agent necessary for the reaction, such, for example, as zinc, magnesium or copper, may be used in the form of an alloy such, for example, as zinc-copper couple. It is of advantage to work in the presence of an inert solvent such as ether, benzene, toluene or a mixture of such solvents. The replacement of the hydroxyl group in the β-naphthyl-(2)-β-alkyl-β-hydroxy-propionic acid ester formed in the first reaction by hydrogen may be carried out, for example, by treatment with an agent capable of eliminating water such as iodine, potassium bisulphate, phosphorus pentoxide, phosphorus oxychloride or the like in the presence or absence of an inert organic solvent, and then saturating the resulting double bond with hydrogen.

The β-naphthyl-(2)-β-alkyl-α,α-dialkyl-propionic acid esters obtainable in accordance with the invention may be converted by hydrolysis into the free acids and the latter into salts.

The final products are intended to find application as medicaments or as intermediae products for making medicaments.

The following example illustrates the invention, the parts being by weight unless otherwise stated and the relationship of parts by weight to parts by volume being the same as that of the gram to the cubic centimeter:

*Example*

Into a three-necked flask fitted with a stirring device, a tube for the introduction of nitrogen, a reflux condenser and dropping funnel are introduced 15.5 parts of magnesium activated with 1.5 parts of iodine and 120 parts by volume of ether. The ethereal solution is warmed to 30° C. and 2.8 parts of benzyl chloride in 80 parts by volume of ether are added while the mixture is stirred and a current of nitrogen is introduced. When the reaction has set in, a mixture of 55.2 parts of naphthyl-(2)-ethyl ketone, 117 parts of α-brom-isobutyric acid ethyl ester and 1 part of benzyl chloride in 250 parts by volume of benzene and 80 parts by volume of ether are added dropwise at a rate such that the reaction mixture does not boil too strongly. After 1 hour, 80 parts by volume of ether are added, and the whole is boiled for a further hour under reflux, and then stirred for 3 hours at room temperature. The whole is then mixed with ice and hydrochloric acid. The organic solution, after being washed with water and dried, is evaporated and 113 parts by weight of an oily residue remain behind, which, for the purpose of eliminating water, is heated with 120 parts of potassium bisulphate in a current of nitrogen for ½ hour at 180° C. After adding water and ether to the reaction product, the ethereal solution is washed in turn with water, dilute caustic soda solution and water, and then dried and evaporated. The residue is distilled under a high vacuum and boiled with 425 parts by volume of caustic soda solution of 30 per cent. strength and 1300 parts by volume of glycol monomethyl ether for ¼ hour in a current of nitrogen under reflux. After distilling 850 parts by volume of solvent the hydrolysis solution is mixed with 3000 parts by volume of water and extracted with ether. The aqueous alkaline solution is acidified with 400 parts by volume of concentrated hydrochloric acid and extracted with ether. The ethereal solution is then washed with water, dried and evaporated. After esterifying the residue with an ethereal solution of diazomethane, there is obtained β-naphthyl-(2)-β-ethylidene-α,α-dimethyl-propionic acid methyl ester which melts at 62–63° C. after recrystallization from methanol.

By hydrogentating the product with a palladium catalyst in methanol, there is obtained β-naphthyl-(2)-β-ethyl-α,α-dimethyl propionic acid methyl ester melting at 70-71° C.

6.57 parts of the hydrogenation product are boiled with 60 parts by volume of caustic soda solution of 30 per cent. strength and 180 parts of glycol monomethyl ether for ¼ hour in a current of nitrogen under reflux. After distilling 120 parts by volume of the solvent, the hydrolysis solution is mixed with 600 parts by volume of water and extracted with ether. β-Naphthyl-(2)-β-ethyl-α,α-dimethyl-propionic acid is isolated from the aqueous alkaline solution by acidification with 90 parts by volume of concentrated hydrochloric acid and extraction with ether. It melts at 124–125° C. after recrystallization from methanol. It corresponds to the formula

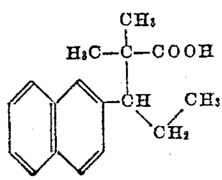

According to the procedure described in the foregoing example, other β-naphthyl-(2)-alkyl-α,α-dialkyl-propionic acids can be obtained. β-naphthyl-(2)-β-ethyl-α,α-diethyl-propionic acid, for example, is made by reacting naphthyl-(2)-ethyl-ketone with α-brom-α,α-diethyl-acetic acid ethyl ester and carrying out the further reactions as described in the example.

Having thus disclosed the invention, what is claimed is:

1. A compound selected from the group consisting of naphthyl-propionic acid and naphthyl-propionic acid esters of the formula

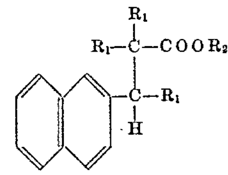

wherein $R_1$ stands for lower alkyl and $R_2$ stands for a member selected from the group consisting of hydrogen and lower alkyl, the said compound being estrogenically highly active.

2. The β-naphthyl-(2)-β-ethyl-α,α-dimethyl-propionic acid of the formula

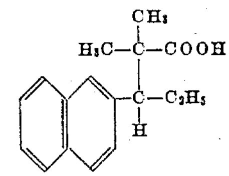

the said acid being estrogenically highly active.

3. The β-naphthyl-(2)-β-ethyl-α,α-dimethyl-propionic acid methyl ester of the formula

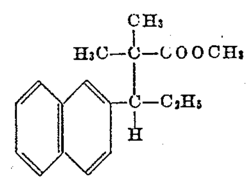

the said ester being estrogenically highly active.

KARL MIESCHER.
PETER WIELAND.

REFERENCES CITED

The following references are of record in the file of this patent:

UNITED STATES PATENTS

| Number | Name | Date |
|---|---|---|
| 2,437,258 | Jones | Mar. 9, 1948 |

FOREIGN PATENTS

| Number | Country | Date |
|---|---|---|
| 231,028 | Switzerland | May 1, 1944 |

OTHER REFERENCES

Mayer et al.: Ber., vol. 55B, p. 1845 (1922).

Cook et al.: J. Chem. Soc., London (1935), p. 1324.

Buu-Hoi et al.: Compt. Rend., vol. 216, pp. 346–348 (1943).

Chem. Ab., vol. 41, p. 8732.

Compt. Rend., vol. 224, pp. 862–864 (1947).

Courrier et al.: Compt. Rend. Biol., vol. 141, pp. 747-748 (1947).